(12) United States Patent
Takahashi et al.

(10) Patent No.: US 7,401,735 B2
(45) Date of Patent: Jul. 22, 2008

(54) COMMODITY PURCHASING MANAGEMENT SYSTEM AND METHOD

(75) Inventors: Naoki Takahashi, Suita (JP); Toshiya Morisugi, Izumi (JP); Takeshi Asai, Kyoto (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 11/222,782

(22) Filed: Sep. 12, 2005

(65) Prior Publication Data

US 2006/0080189 A1 Apr. 13, 2006

(30) Foreign Application Priority Data

Sep. 24, 2004 (JP) ............................. 2004-277009

(51) Int. Cl.
*G06F 19/00* (2006.01)

(52) U.S. Cl. .................... 235/385; 235/383; 705/22

(58) Field of Classification Search ................ 235/385, 235/383; 705/22, 28
See application file for complete search history.

(56) References Cited

U.S. PATENT DOCUMENTS

| | | | | |
|---|---|---|---|---|
| 5,120,941 A | * | 6/1992 | Reilley et al. ............ 235/375 |
| 5,918,211 A | * | 6/1999 | Sloane ..................... 705/16 |
| 5,940,808 A | * | 8/1999 | Joseph ..................... 705/28 |
| 5,946,662 A | * | 8/1999 | Ettl et al. .................. 705/8 |
| 6,105,004 A | * | 8/2000 | Halperin et al. ........... 705/28 |
| 6,144,945 A | * | 11/2000 | Garg et al. ................ 705/28 |
| 6,324,522 B2 | * | 11/2001 | Peterson et al. ........... 705/28 |
| 6,338,053 B2 | * | 1/2002 | Uehara et al. ............. 707/1 |
| 6,736,316 B2 | * | 5/2004 | Neumark ................. 235/383 |
| 7,168,618 B2 | * | 1/2007 | Schwartz ................. 235/383 |

FOREIGN PATENT DOCUMENTS

JP 2002-109302 4/2002

* cited by examiner

*Primary Examiner*—Ahshik Kim
(74) *Attorney, Agent, or Firm*—Staas & Halsey LLP

(57) ABSTRACT

An automated commodity customer delivery driven method/system to manage commodity sales by acquiring a chance of purchase of a selecting customer as well as another new customer for a relevant commodity by assuring availability of the inventory for both customers of the relevant commodity. The shop inventory for the selecting customer is acquired according to acceptance of a temporary reservation status for requesting acquisition of the inventory of the selected commodity and the inventory in the shop that was acquired for the selecting customer is returned to the number of inventories for selling to the other new customer, based upon a specified method of transferring the selected commodity to the selecting customer.

19 Claims, 9 Drawing Sheets

| CUSTOMER CODE | | | ~121 |
|---|---|---|---|
| NO. OF POINTS | | | ~122 |
| HISTORY 123 — 124 | TRANSACTION INFORMATION | DATE | ~1231 |
| | | SHOP CODE | ~1232 |
| | | COMMODITY CODE | ~1241 |
| | | NO. OF COMMODITIES | ~1242 |
| | | STATUS CODE (TEMPORARY RESERVATION, SETTLEMENT, COMPLETION OF TRANSFER, DELIVERY, TEMPORARY RESERVATION OF DELIVERY) | ~1243 |
| | | TIME | ~1244 |
| | | DATE OF TRANSFER | ~1245 |
| ⋮ | | | |

FIG. 3

| CUSTOMER CODE | | ~311 |
|---|---|---|
| NO. OF POINTS | | ~312 |
| DATE | | ~313 |
| SHOP CODE | | ~314 |
| CONTACT ADDRESS | | ~315 |
| TRANSACTION INFORMATION 316 | COMMODITY CODE | ~3161 |
| | NO. OF COMMODITIES | ~3162 |
| | STATUS CODE (TEMPORARY RESERVATION, SETTLEMENT, COMPLETION OF TRANSFER, DELIVERY, TEMPORARY RESERVATION OF DELIVERY) | ~3163 |
| | TIME | ~3164 |
| | DATE OF TRANSFER | ~3165 |
| ⋮ | | |

FIG. 4

COMMODITY PURCHASING MANAGEMENT SYSTEM AND METHOD

CROSS-REFERENCE TO RELATED APPLICATIONS

This application claims the benefit of Japanese Application No. 2004-277009, filed Sep. 24, 2004, in the Japan Patent Office, the disclosure of which is incorporated herein by reference.

BACKGROUND OF THE INVENTION

1. Field of the Invention

The present invention relates to a commodity sales management system. Particularly, the present invention relates to a commodity purchasing management system for acquiring chances of purchase by new customers, while attaining the inventory for the customers who have selected the commodities.

2. Description of the Related Art

A selling or shopping method at a shop may be roughly classified into two types of selling methods. In one selling method, a customer carries a commodity selected from those being displayed to a determined place of settlement, such as a place where a cash register is installed, and purchases the relevant commodity at the place of settlement. The selling method has been employed, for example, at a shop such as a supermarket for dealing with miscellaneous commodities for daily use.

In another selling method, the desired commodity may be purchased by designating a commodity to be purchased at the place of settlement using a commodity card attached to a corresponding commodity in a showcase. This selling method is employed, for example, at a volume retailer or the like of household electric appliances. The practical sequence in this selling method is as follows.

First, a customer decides to purchase based upon samples of commodities displayed in the showcase by evaluating the same with a hand or the like and then obtains commodity cards as many as the commodities desired to be purchased from the commodity cards attached to the showcase or the like corresponding to the desired commodities. When the customer presents the commodity cards at the place of settlement, the commodities to be purchased may be designated and these commodities are transferred or delivered after the settlement.

Accordingly, in this selling method using the commodity cards described above, it is required that the number of commodity cards attached to the corresponding commodities in the showcase indicates the number of commodities in inventories provided for selling. However, a customer having obtained the commodity card does not always purchase the commodity designated by the commodity card. Moreover, in some cases, the commodity card may be taken by other action, such as mischief or the like, or a commodity card may be replaced or misplaced with that attached to another commodity. Therefore, the number of commodity cards often does not adequately indicate the number of commodities in inventories provided for selling. Accordingly, even when the inventory provided for selling is prepared, the commodity card is sometimes missing, resulting in the situation that a chance of purchase of/by a customer who is hoping to purchase a certain commodity may be lost.

In view of eliminating such disadvantage, supplement of commodity cards must be performed adequately so that the number of commodity cards attached to the commodities in the showcase is always matched with the number of commodities in inventories provided for selling. However, for example, there can be a situation when a customer is discussing or contemplating purchase of the relevant commodity from which the attached commodity card has been removed by other customer and the other customer who is in the course of moving to the place of settlement has the commodity card of the relevant commodity. Therefore, when a commodity card supplement is made at a time of adjusting the number of commodity cards so that the commodity card is matched with the number of commodities in inventories provided for selling, there can be a situation in which commodity cards within the shop exceed the number of commodities in inventories provided for selling. In this case, a situation may be generated that a customer who has obtained a commodity card cannot purchase such commodity, because the commodity cards exceed the number of inventory commodities.

SUMMARY OF THE INVENTION

Therefore, it becomes very important, in view of not allowing the chance of purchase by the customer to be lost, for the shop to keep or maintain availability of the commodity in the inventory provided for selling, from the time when the customer selects the relevant commodity until or before or prior the time of actual settlement by the customer for the relevant commodity.

The present invention is directed to a concept where inventory availability of the commodities, as the object of selling and purchasing in a selling method at a volume retailer or the like using the commodity cards as described above, are always or substantially guaranteed as a constant quality almost without any difference among individual commodities.

In general, in one aspect, the present invention relates to a commodity purchasing management system comprising a customer identifying information acquiring means for acquiring the customer identifying information to identify a customer, an inventory storage means for storing the number of inventories of each commodity and the number of inventories provided for selling of the relevant commodity, a commodity identifying means for identifying the commodities requested by a customer, a transfer method identifying means for identifying, on the basis of the request by a customer, the method of transfer of the commodities obtained from the commodity identifying means requested by the customer, a judging means for judging whether the number of inventories provided for selling of the relevant commodities in the inventory storage means should be assigned or not to the customer indicated by the customer identifying information obtained from the customer identifying information acquiring means in accordance with the transfer method obtained from the transfer method identifying means, and a commodity assigning means for assigning the number of inventories provided for selling of the relevant commodity in the inventory storage means to the customer indicated by the customer identifying information obtained from he customer identifying information acquiring means in accordance with the result of the judging means.

In general, in one aspect, the present invention relates to an commodity purchasing management system in which assignment of the number of inputs of a relevant commodity to a quasi-inventory storage means is judged to be conducted, and the commodity assigning means assigns the number of inventories provided for selling of the relevant commodity of the inventory storage means to the customer indicated by the customer identifying information obtained from the customer identifying information acquiring means in accordance with the result of the judging means or assigns the number of inputs of the relevant commodity of the quasi-inventory storage means.

In general in one aspect, the present invention relates to an commodity purchasing management system for exclusively conducting the update process of the inventory storage means and the quasi-inventory storage means of the commodities identified by the commodity identifying means until the commodities are assigned with the commodity assigning means from the selection of the commodity transfer method by the transfer method identifying means.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a diagram illustrating a structure of a customer table 120 in the embodiment of the present invention.

FIG. 4 is a diagram illustrating a structure of a customer card information 510 in the embodiment of the present invention.

DETAILED DESCRIPTION OF THE PREFERRED EMBODIMENTS

Figures 1, 2:
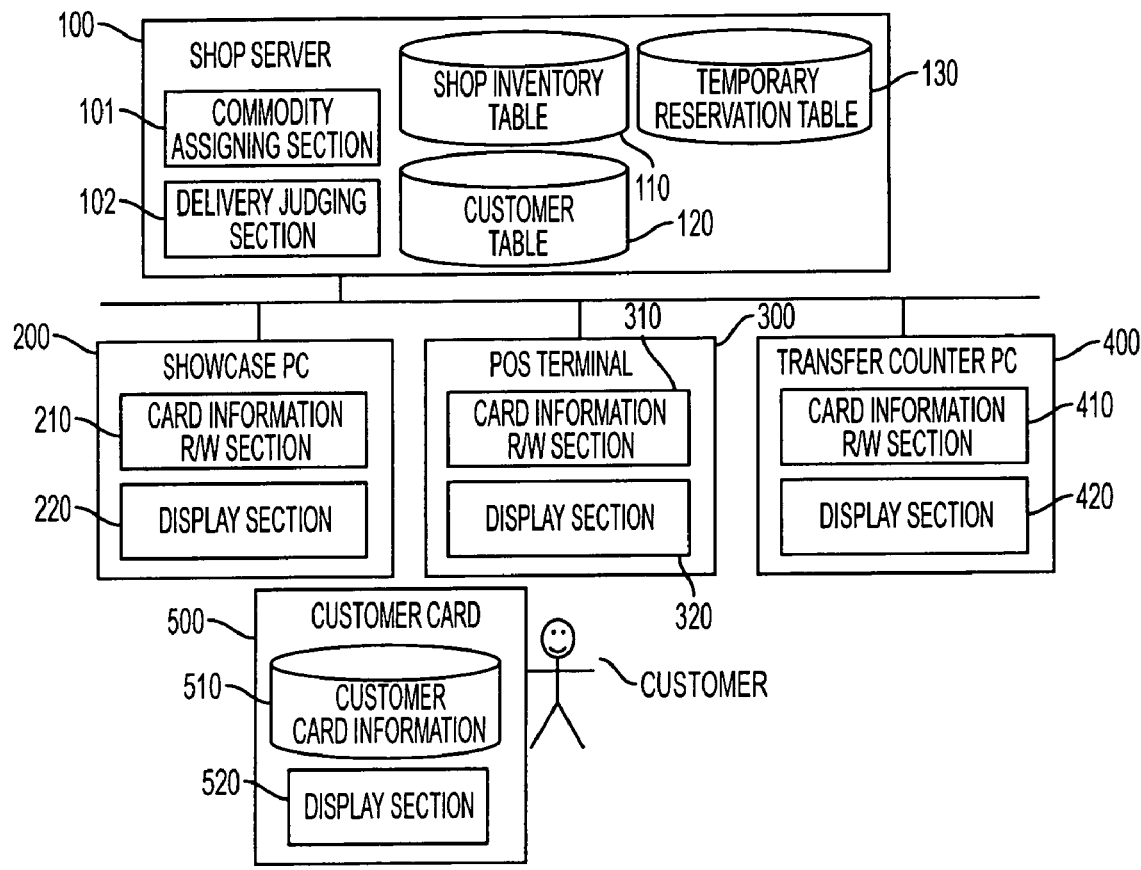
FIG. 1 is a diagram illustrating a structure of a system in one embodiment of the present invention.
FIG. 2 is a diagram illustrating a structure of a shop inventory table 110 in the embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

Therefore, in a selling method using a commodity card or the like, it is very important in view of maintaining a chance of purchase by a customer, to acquire or reserve or hold the inventories provided for selling based upon the selection of the commodity by the customer who has selected the commodity until the settlement processing for the commodity by the customer.

However, since the customer who has selected the commodity does not always purchase the same commodity, if the commodity inventory availability is only acquired based upon the customer who has selected such commodity or even based upon the customer who has settled for such commodity, the chance of purchase of another new customer who newly desires to purchase may still be lost in some cases.

According to a preferred embodiment of the present invention, it is possible to provide an automated commodity customer delivery driven method/system to acquire a chance of purchase of a selecting customer as well as another new customer for a relevant commodity by assuring availability of the inventory for the customer who has selected the commodity by acquiring the shop inventory for the customer who has selected the relevant commodity in accordance with acceptance of a "temporary reservation" for requesting acquisition of the inventory of the selected commodity and returning the inventory in the shop that was acquired for the relevant customer to the number of inventories for selling to the other customers when the transfer method of the commodity designated by the customer is not "take-out on that day" method.

FIG. 1 is a diagram illustrating a structure of the system in an embodiment of the present invention. The system structure in this embodiment comprises a shop server 100, a showcase PC (Personal Computer; Terminal) 200, a POS (Point of Sales) terminal 300, a transfer counter PC 400, which are making communication through a network, and a customer card 500. Therefore, the embodiments described herein are implemented in programmable apparatuses and/or software.

The shop server 100 comprises a commodity assigning section 101 for assigning a number of inventories (comprising actual 1151—FIG. 2—and/or temporarily reserved 1152—FIG. 2) for selling and/or a number of quasi-inventories to customers, a delivery acknowledgment or non-acknowledgment judging section 102 for judging whether the number of inventories for selling and/or the number of quasi-inventories should be assigned in accordance with the transfer or delivery method selected by customers, a shop inventory table 110, a customer table 120, and a temporary reservation table 130.

The showcase PC 200 comprises a card information read/write section 210 for reading or writing the information (customer card information) 510 stored in the customer card 500 and a display section 220 for displaying the commodity selection display format and the transfer method selection display format or the like.

The POS terminal 300 comprises a card information read/write section 310 for reading or writing the customer card information 510 stored in the customer card 500 and a display section 320 for displaying the transfer method verifying display format or the like.

The transfer counter PC 400 comprises a card information read/write section 410 for reading or writing the customer card information 510 stored in the customer card 500 and a display section 420 for displaying the information of the commodity as the transfer object.

The customer card 500 comprises the customer card information 510 including the customer code or the like for identifying a customer and a display section 520 for displaying the commodity information or the like displayed on the basis of the transaction information recorded in the customer card information.

FIG. 2 is a diagram illustrating a format of the shop inventory table 110. The shop inventory table 110 includes a shop code 111 for uniquely identifying a shop, a commodity code 112 for uniquely identifying a commodity, JAN (Japan Article Number) code 113 as the barcode data standardized by JIS (Japanese Industrial Standards) (or any other type of commodity/item identification system), a shelf number 114 indicating the storing place of inventory in the backyard, the inventory information 115 including the information such as the number of present inventories, and the quasi-inventory information 116 including the information such as the number of commodities or the like to be supplemented next. The inventory information 115 includes the number of inventories 1151 indicating the present number of inventories in the backyard, the number of temporary reservation inventories 1152 indicating the number of inventories acquired for the customers who have completed the temporary reservation, the number of transfer inventories 1153 indicating the number of inventories to be transferred to the customers who have completed the settlement, and the number of delivery inventories 1154 indicating the number of inventories to be delivered to the customers who have completed the settlement. The quasi-inventory information 116 includes the supplement date 1161 indicating the date of the next commodity supplement, the number of supplemented commodities 1162 indicating the number of commodities to be supplemented next, and the number of temporary reservations 1163 indicating the number of commodities temporarily reserved for the commodities to be supplemented next.

FIG. 3 is a diagram illustrating a format of the customer table 120 of the shop server 100. The customer table 120 includes a customer code 121 for uniquely identifying a customer, the number of points 122 indicating the total points granted in accordance with the amount of purchase of a customer, the history information 123 indicating the history of purchases of a customer until the present purchase with inclusion of the date of transaction 1231, shop code 1232 indicating the shop completing the transaction, and the transaction information 124 indicating the commodity as the object of transaction. The transaction information 124 further includes a commodity code 1241 indicating the commodity as the object of transaction, the number of commodities 1242 as the object of transaction, a state 1243 of commodity as the object of transaction, the time 1244 indicating the time when the transaction is completed, and a transfer date 1245 indicating the date of delivery of commodity.

FIG. 4 is a diagram illustrating a format of the customer card information 510. The customer card information 510 includes a customer code 311 for uniquely identifying a customer, the number of points 312 indicating the total points granted in accordance with the amount of purchase of a customer, the date 313 indicating the last transaction date, a shop code 314 indicating the shop having completed the last transaction, a contact address 315 indicating the address for making contact to a customer, and the transaction information 316 indicating the commodity or the like as the object of transaction. The transaction information 316 includes a commodity code 3161 indicating the commodity as the object of transaction, the number of commodities 3162 as the object of transaction, a state 3163 of commodity as the object of transaction, the time 3164 indicating the time when the transaction is completed, and the delivery date 3165 indicating the date of delivery of commodity.

Figure 5:
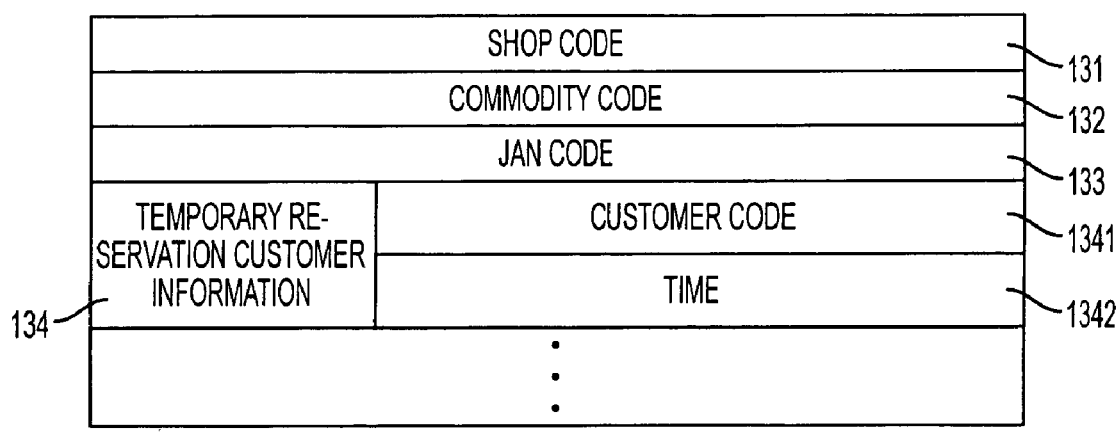
FIG. 5 is a diagram illustrating a structure of a temporary reservation table 130 in the embodiment of the present invention.

FIG. 5 is a diagram illustrating a format of the temporary reservation table 130. The temporary reservation table 130 includes a shop code 131 indicating the shop having accepted the temporary reservation, a commodity code 132 indicating the commodity temporarily reserved, the JAN code 133 indicating the barcode information of the relevant commodity, and the temporary reservation customer information 134 indicating a customer who has made the temporary reservation of the relevant commodity. The temporary order (temporary reservation) information 134 includes a customer code 1341 for identifying the customer who has made the temporary order of the relevant commodity and the time 1342 indicating the time when the relevant temporary reservation has been accepted.

Next, flows of processes when the commodity is selected will be described with reference to FIGS. 6A-6B. First, when a customer forwards its own customer card 500 over a card information read/write section 210 of a showcase PC 200 provided at the commodity showcase, the showcase PC 200 reads the customer card information 510 of the customer card 500 via the card information read/write section 210 (S101 in FIG. 6A).

Figure 6A:
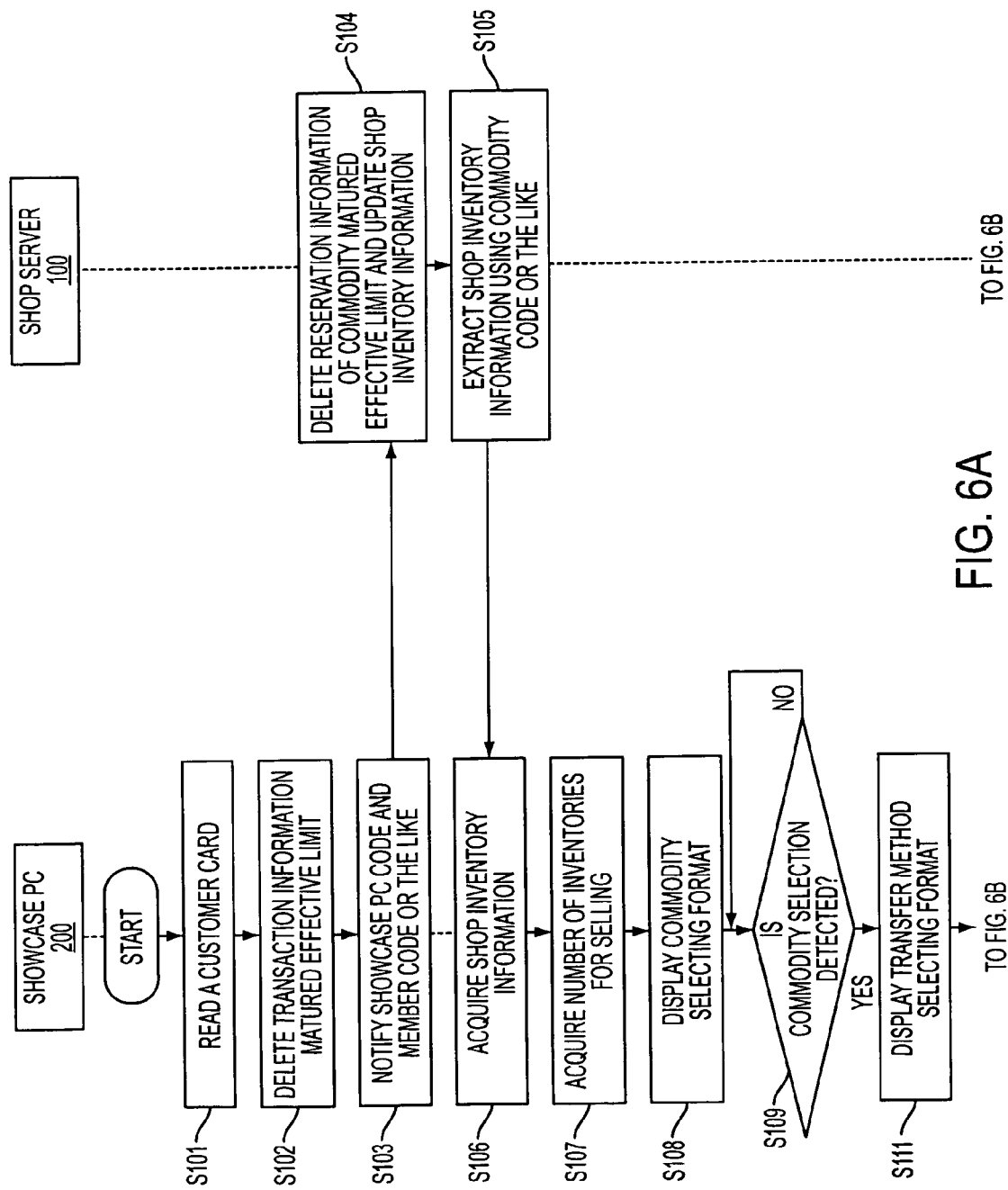
FIGS. 6A-6B is a flowchart of selecting a commodity in the embodiment of the present invention.

The showcase PC 200 deletes the transaction information 316 having matured expired or reaching the effective limit for the customer card information 510 obtained (S102 in FIG. 6A). For example, if the date in the customer card information does not match with the system date in the showcase PC 200, the entire contents of the transaction information 316 for the customer card information 510 are judged to have matured the effective limit and the entire contents of the transaction information 316 in the customer card information are deleted via the card information read/write section 210.

Moreover, for example, when the date in the customer card information is matched with the system date of the showcase PC, the transaction information which has passed the predetermined time from the time 3164 indicated in the transaction time for the transaction information included in the customer card information is judged to have matured the effective limit and the transaction information 316 having passed the predetermined time from the time 3164 is deleted via the card information read/write section 210.

Next, the showcase PC provides a showcase PC code for uniquely identifying the showcase PC and the customer code 311, or the like read from the customer card 500, to the shop server 100 (S103 in FIG. 6A). The shop server 100 having received the notice of showcase PC code and the customer code 311, deletes the transaction information 124 for the customer code 311, 121 from the customer table 120 of the shop server, which has matured the effective limit as in the case of the step S102 in the showcase PC 200 (S104 in FIG. 6A). The number of temporary reservation inventories 1152 of the shop inventory information 110 identified using the commodity code indicated in the deleted transaction information is updated to the value obtained by subtracting the number of commodities 1242 indicated in the transaction information 124. Thereafter, the shop server 100 extracts the shop inventory information 110 corresponding to the commodity code 112 included in a commodity code list information related to the showcase PC code provided from the showcase PC 200 and returns such shop inventory information 110 to the showcase PC 200 (S105 in FIG. 6A).

The showcase PC 200 obtains the shop inventory information 110 from the shop server 100 (S106 in FIG. 6A) and also obtains the number of inventories for selling from the inventory information 115 included in the shop inventory information 110 (S107 in FIG. 6A). More particularly, the number of inventories for selling is obtained by subtracting the number of temporary reservation inventories 1152, the number of transfer inventories 1153 and the number of delivery inventories 1154 from the number of inventories 1151 of the inventory information 115 indicated by the shop inventory information 110. The number of transfer inventories 1153 is the number of inventories to be transferred for the customer who has selected "take-out" and completed the settlement. That is, the number of transfer inventories 1153 is the number of inventories to be transferred to the customer at the transfer counter. Hence, as described herein, when the selected transfer method is "take-out," the shop server 100 updates the number of transfer inventories 1153 by adding the number of commodities 1242 indicated in the transaction information 124. The number of delivery inventories 1154 is the number of inventories to be delivered for the customer who has selected "delivery" and completed the settlement. Hence, as described herein, when the next supplement is judged not to be acquired before the desirable date of delivery, the number of delivery inventories 1154 is updated by adding thereto the number of commodities of temporary reservation for the delivery to customer.

Figure 9:
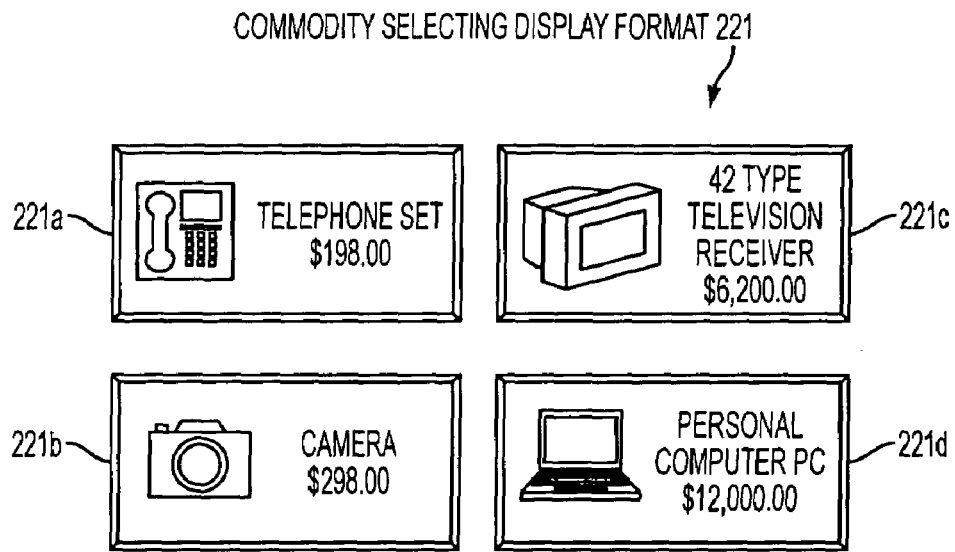
FIG. 9 is a diagram illustrating a display example of a commodity selection display format in the embodiment of the present invention.

Next, the showcase PC 200 displays the selection display format (user interface) of the commodity to be processed via the display section 220 thereof (S108 in FIG. 6A) and accepts selection of commodity (S109 in FIG. 6A). FIG. 9 is a diagram illustrating a display example of the commodity selection display format displayed on the display section 220 of the showcase PC 200. In the display example of FIG. 9, the four commodity selecting sections 221a, 221b, 221c, 221d are displayed in the commodity selection display format 221. A customer can input a temporary reservation by selectively depressing the selecting sections 221a, 221b, 221c, and 221d displayed on the display section 220 of the showcase PC 200. In the commodity selection display format, the commodity selecting sections may also be displayed with discrimination in accordance with the number of inventories for selling of each commodity.

Figure 10:
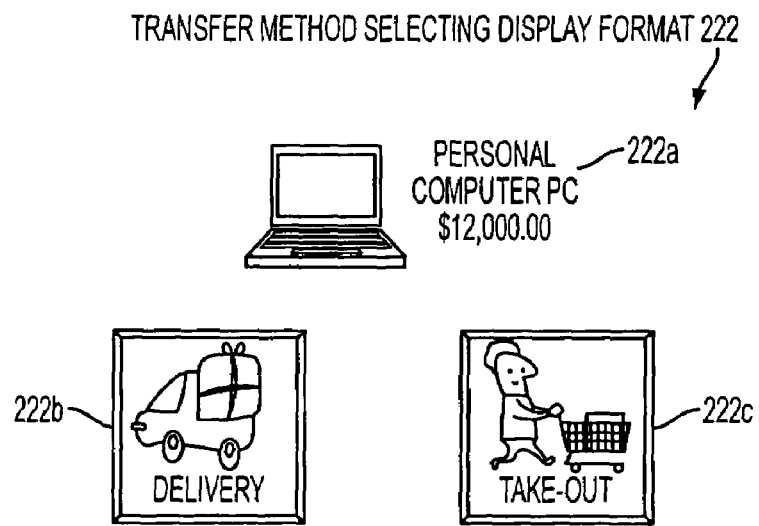
FIG. 10 is a diagram illustrating a display example of the transfer method selecting display format in the embodiment of the present invention.

The showcase PC 200 having detected the commodity selection accepts the temporary reservation of a customer and then displays a format (user interface) for selecting a commodity transfer method (transfer method selecting display format) on the display section 220 (S111 in FIG. 6A). FIG. 10 illustrates a display example of the transfer method selecting display format. In this example, the transfer method selecting display format indicates the "Personal Computer ($12,000)" that was selected in the commodity selection display format (user interface) described above with reference to FIG. 9. The information 222a for the selected commodity is displayed at the upper part of the commodity selecting display format of FIG. 10 and the "delivery" input section 222b and the "take-out" input section 222c are also displayed as selectable displayed input items of transfer/delivery methods.

Figure 6B:
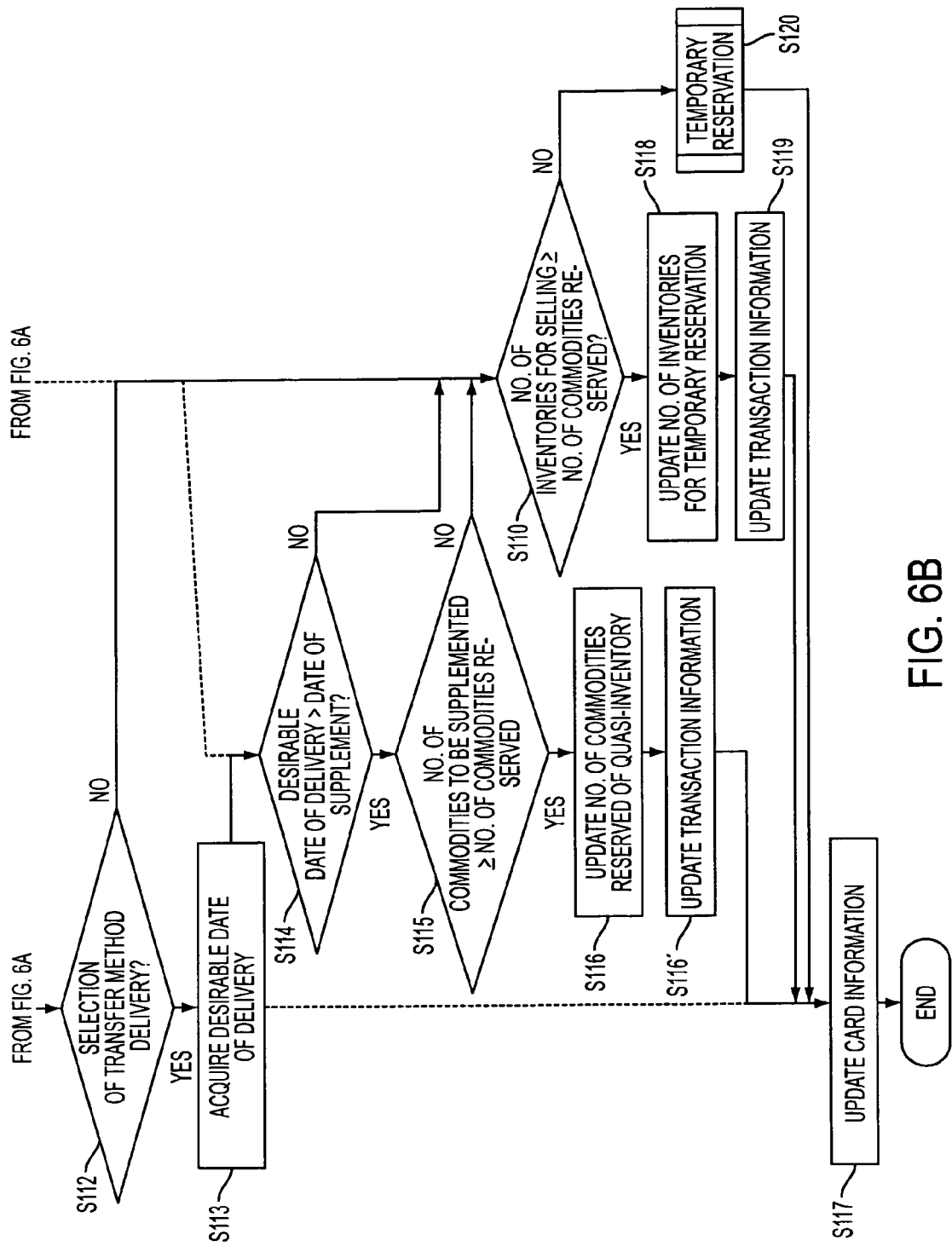

A customer can input the commodity transfer method by selectively depressing each selecting section 222b, 222c displayed on the display section 220 of the showcase PC 200 (S112 in FIG. 6B).

Here, when the "take-out" method is input as the commodity transfer method (NO decision of S112 in FIG. 6B), the showcase PC 200 notifies, to the shop server 100, the customer code 311 for identifying a customer, date and time of 3164, 3165 accepting the temporary reservation, and the commodity code 3162 or the like for identifying the commodity in order to request update of the transaction information 124 and shop inventory information 110. The shop server 100 having received the update request verifies the number of inventories for selling of the commodity identified with the commodity code 3162 and judges whether the number of inventories for selling is equal to or larger than the number of commodities temporarily reserved (S110 in FIG. 6B). As a result, when the number of inventories for selling is judged to be equal to or larger than the number of commodities temporarily reserved (YES of S110 in FIG. 6B), update of information is carried out by adding the number of commodities temporarily reserved to the number of temporary reservation inventories 1152 indicated in the inventory information 115 of the shop inventory table 110 (S118 in FIG. 6B).

Moreover, the transaction information 124 including the information of the selected commodity is added to the history information 123 including the date and time which are identical to that of accepting the temporary reservation, in the customer information of the customer table 120 (S119 in FIG. 6B) of the shop server 100. The information of the selected commodity explained above includes the commodity code 1241 which is set corresponding to the commodity selecting sections 221a-d selectively input by a customer using the display section 220 of the showcase PC 200, the number of commodities temporarily reserved 1242, state code (temporary reservation) indicating acceptance of temporary reservation, the time 1244 indicating the time when the temporary reservation is accepted, and the transfer date 1245 indicating the date of delivery of commodity. Typically, input of the number of commodities to be temporarily reserved is executed by providing a display format for inputting the number of commodities after depression of the commodity selecting sections 221a-d in the commodity selecting display format 221 illustrated in FIG. 9.

Thereafter, the showcase PC 200 writes, using the card information read/write section 220, the transaction information 316 including the information of the selected commodity from the transaction information 124 of the customer information 120 of the shop server 100, to the customer card information 510 of the customer card 500, as in the case of the process S119 described above (S117 in FIG. 6B). The processes explained above are executed for selection of commodity when "take-out" is selected as the commodity transfer method. Accordingly, the inventory for the relevant customer has been acquired and thereby a customer can think of purchasing other commodities continuously without worrying about sold-out state of the selected commodity.

It is also possible that acquisition of inventory by acceptance of the temporary reservation described above may be invalidated after a predetermined time has passed from acceptance of temporary reservation (i.e., a temporary reservation expiration time). Moreover, useless acquisition or reservation or hold of the inventory, which occurs when the temporarily reserved commodity has not been purchased, can be eliminated so that the inventory collected can accommodate a chance of purchase by a new customer by providing an effective limit time for acquisition of the inventory based on the acceptance of the temporary reservation. More particularly, the shop server 100 executes the following operations concerning the temporary reservation table 130, the shop inventory 110 and customer table 120: (1) referring to a time 1342 of the temporarily reservation customer information 134 stored in the temporary reservation table 130; (2) evaluating whether a predetermined time have elapsed from the time 1342; (3) detecting, from the temporary reservation table 130, a reservation customer information 134 of which a predetermined time have elapsed from the time 1342; (4) extracting the transaction information 124 of the customer table 120 corresponding to a value of the detected reservation customer information, such as the customer code 1341, the shop code 131 and the commodity code 132; (5) invalidating the extracted transaction information 124 and updating the no. of temporary reservation inventories 1152 of the shop inventory table 110 corresponding to the value of the detected reservation customer information 134 in the temporary reservation table 130.

In addition, it is desirable in this embodiment that the update process of the inventory information is exclusively executed from detection of the input of the selected transfer method in the step S112 described above, and through update of the number of temporary reservation inventories 1152 in the step S118 described above. However, when the exclusive processing time is set in a range longer than the temporary reservation expiration time described above, the response time for the temporary reservation acceptance when the commodities are selected for a plurality of customers also becomes longer. When the exclusive processing time is set in the range shorter than the temporary reservation expiration time described above, it becomes difficult to maintain matching property of the inventory information in the temporary reservation acceptance process when the commodities are selected for a plurality of customers.

Meanwhile, when "delivery" is input in the transfer method selecting display format in the step S111 (YES decision of S112 in FIG. 6B), the showcase PC 200 displays the display format for requesting input of the desired date of delivery to accept input of the desired date of delivery from a customer, notifies (provides) the commodity code 3161 for identifying the selected commodity and the desired date of delivery 3165 or the like, to the shop server 100, and requests thereto execution of the process for delivery (S113 in FIG. 6B).

The shop server 100 having received such request from the showcase PC 200 judges first whether the next supplement can be acquired before the desired date of delivery by referring to the date of commodity supplement 1161 indicated in the quasi-inventory information 116 of the shop inventory table 110 identified by the commodity code 3161, 1241 notified from the showcase PC 200 (S114 in FIG. 6B).

For example, when the desired date of delivery 3161 is set later than the date of next commodity supplement, the next commodity supplement is judged to be acquired before the desired date of delivery 3161 (YES of S114 in FIG. 6B) and moreover it is judged whether the number of temporary reservation inventories for delivery to a customer is enough for the next supplement (S115 in FIG. 6B).

For example, when the number of commodities to be supplemented next 1162 indicated by the quasi-inventory information 116 described above is equal to or larger than the number of commodities reserved, which is obtained by adding the number of commodities of temporary reservation already decided 1152 to the number of temporary reservation commodities 1163 for the commodities to be supplemented next, the number of temporary reservation commodities to be delivered to a customer is judged to be enough for the next supplement (YES of S115 in FIG. 6B) and the number of commodities can be updated by adding the number of temporary reservation commodities delivered to a customer to the number of temporary reservation commodities 1163 indicated in the quasi-inventory information 116 described above (S116 in FIG. 6B).

Moreover, the transaction information 124 is added, in the same manner as the step S119, to the history information 123 having the same date and time as the date and time of acceptance of the temporary reservation in the customer information of the customer table 120 of the shop server 100 identified with the customer code 311 notified from the showcase PC 200 (S116' in FIG. 6B).

In particular, the status code 1243 indicated in the transaction information 124 becomes the status code (temporary reservation of delivery) indicating acceptance of temporary reservation of delivery. Moreover, as the transfer date 1245 indicated in the transaction information 124, the desired date of delivery input in the step S113 is set.

Thereafter, the showcase PC 200 writes (S117 in FIG. 6B) the transaction information 316 including the information of the selected commodity, like in step S119 described above, to the customer card information 510 of the customer card 500. Above process is executed when "delivery" is selected as the transfer method. This process is the flow of processes when the commodity is selected in the case where the next supplement is judged to be acquired before the desired date of delivery.

In the display format when the desired date of delivery is input in the step S113 described above, the date enabling assignment in the supplements after the next supplement can be displayed with discrimination from the other dates.

Moreover, in this embodiment, it is desirable that the update process of the quasi-inventory information 116 is executed exclusively from detection of input for selection of transfer method in the step S112 described above, and through update of the number of commodities of temporary reservation 1163 of quasi-inventory in the step S116. However, when the period for exclusive process is set longer than the temporary reservation expiration time described above, the response time to the temporary acceptance process when the commodities are selected for a plurality of customers becomes longer. In addition, when the period for exclusive process is set shorter than the temporary reservation expiration time described above, it becomes difficult to maintain the matching property of the quasi-inventory information in the temporary acceptance process when the commodities are selected for a plurality of customers.

Moreover, when the desirable date of delivery is set, in the step S114 described above, to the date before the date of the next supplement (NO of S114 in FIG. 6B), or when in step S115 described above, a number of commodities reserved, which is obtained by adding the number of commodities of temporary reservation already decided 1152 to the number of temporary reservation commodities 1163 for the commodities to be supplemented next, is greater than the number of commodities to be supplemented 1162 (NO of S115 in FIG. 6B), the commodities of the next supplement is judged not to be acquired before the desirable date of delivery and the processes similar to that when the "take-out" is selected as the transfer method are executed in order to make the temporary reservation for the customer from the inventory for selling already stored in the shop. Namely, the inventory for selling is judged, in the step S110 described above, to be larger or not than the number of commodities for temporary reservation for the customer. When the number of inventories for selling is judged to be enough for assignment to the customer (YES of S10 in FIG. 6B), the number of inventories of temporary reservation 1152 is updated (S118 in FIG. 6B), the transaction information 123, 124 is updated (S119 in FIG. 6B), and the card information 510 is updated (S117 in FIG. 6B).

The status code 1243 indicated in the transaction information 124 becomes the status code (temporary reservation) indicating acceptance of the temporary reservation. Moreover, as the transfer date 1245 indicated in the transaction information 124, the desirable date of delivery inputted in the step S113 is set. Thereafter, the showcase PC 200 writes, using the card information read/write section 220, the transaction information 316 including the information of the selected commodity to the customer card information 510 of the customer card 500 like the step S119 described above (S117 in FIG. 6B). The processes described above are executed when the delivery is selected as the transfer method. Namely, the above processes are flows of processes when the commodity is selected when the next commodity supplement is judged not to be acquired before the desirable date of delivery.

Moreover, it is desirable, in this embodiment, that the update process of the inventory information 115 is executed exclusively from detection of input for selection of the transfer method in the step S112 described above, and through update of the number of inventories of temporary reservation inventories 1152 in the step S118 described above. However, when the period required for exclusive process is set longer than the temporary reservation expiration time described above, the response time to the temporary reservation process when the commodity is selected for a plurality of customers becomes longer and when the period for exclusive process is set to the period shorter than the temporary reservation expiration time described above, it becomes difficult to maintain the matching property of the inventory information in the temporary reservation process when the commodity is selected for a plurality of customers.

Meanwhile, when the number of inventories for selling is judged to be not enough in the step S110 in FIG. 6B (NO of S110 in FIG. 6B), a customer inputs temporary reservation via the temporary reservation acceptance display format displayed on the display section 220 of the showcase PC 200 (S120 in FIG. 6B). The showcase PC 200 writes the transaction information 316 like the step S119 in FIG. 6B described above when input of the temporary reservation is detected (S120 in FIG. 6B).

The status code 1243, 3163 indicated in the transaction information 124 of the customer table 120 of the shop server 100 and the transaction information 316 of the customer card information 510, respectively, becomes the status code (temporary reservation) indicating acceptance of the temporary reservation. Thereafter, the shop server 100 registers the temporary reservation customer information for the commodity to which the temporary reservation is executed to the temporary reservation table 130 (S120 in FIG. 6B).

More particularly, the showcase PC 200 writes, using the card information read/write section 220, the transaction information 316 including the information of the selected commodity like the process S119 described above to the customer card information 510 of the customer card 500 (S117 in FIG. 6B). Processes described above are executed when the temporary reservation is accepted.

Here, the commodity selecting section of the commodity having one or more inventories for selling may be displayed in discrimination (differently) from the commodity selecting section of the commodity having one or less inventories for selling. Moreover, the commodity selecting section may also be displayed in discrimination in accordance with the number of inventories for selling.

Moreover, when the number of inventories for selling is judged to be not enough in the step S110 described above, it is also allowed to display the display format to urge alteration of the transfer method or the desirable date of delivery in the transfer method selecting display format displayed on the display section of the showcase PC.

Accordingly, convenience for selection of commodity may be improved for the customers who are searching the commodity which can be available on that day. Moreover, it may also be allowed to introduce the structure to display with priority the commodities of the large amount of inventories. Thereby, a shop is capable of realizing effective use of the inventories through smooth rotation of inventories of each commodity.

Figure 7A:
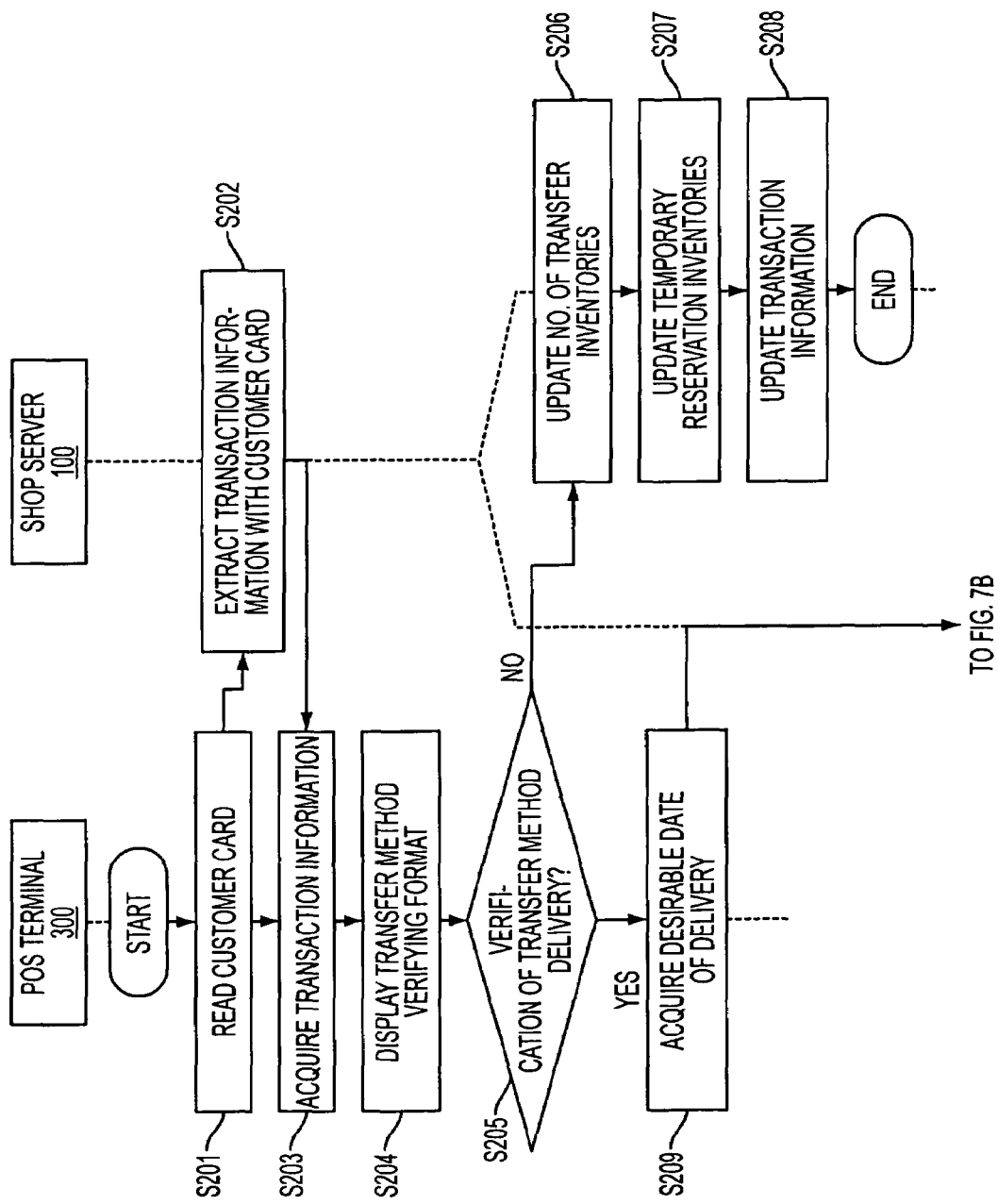
FIGS. 7A-B is a flowchart of settlement in the embodiment of the present invention.

Next, flows of processes required for settlement will be explained with reference to FIGS. 7A-7B. First, a staff of the shop reads, using the card information read/write section 310 of the POS terminal 300, the customer card information 510 of the customer card presented by a customer into the POS terminal (S201 in FIG. 7A).

The POS terminal 300 notifies the customer code 311 read from the customer card information 510 and the date and time (date and time of settlement) of reading the customer card information 510 to the shop server 100 to request acquisition of the transaction information 124. The shop server 100 obtains, from the customer table 120, the customer information corresponding to the customer code 311 received from the POS terminal 300, extracts the transaction information 124 having the status code 1243 of the temporary reservation from the history information 123 of the same date and time as that of the settlement, and then returns the transaction information 124 to the POS terminal 300 (S202 in FIG. 7A).

The POS terminal 300 having acquired (S203 in FIG. 7A) the transaction information 124 of the temporary reservation, displays (S204 in FIG. 7A), using the display section 320, the display format (transfer method verifying display format) for requesting verification of the transfer method for each commodity identified with the commodity code 1241 in the transaction information 124. The staff of shop inquires, to the customer who has presented the customer card, the desirable transfer method of "take-out" or "delivery" and then selectively inputs the transfer method which the customer desires.

When "take-out" is selected as the transfer method (NO of S205 in FIG. 7A), the POS terminal 300 requests, to the shop server 100, execution of the processes for "take-out". The shop server 100 having received such request updates the number of transfer inventories 1153 indicated in the inventory information 115 of the shop inventory table 110 by adding thereto the number of commodities 1242 indicated in the transaction information 124 described above (S206 in FIG. 7A).

Moreover, the number of inventories of temporary reservation 1152 indicated in the inventory information 115 of the shop inventory table 110 described above is also updated by subtracting therefrom the number of commodities 1242 indicated in the transaction information 124 described above (S207 in FIG. 7A). The shop server 100 updates the status code 1243 indicated in the transaction information 124 described above to settlement status from temporary reservation status (S208 in FIG. 7A). The flows of processes described above are executed for the settlement when "take-out" is selected as the transfer method.

Figure 7B:
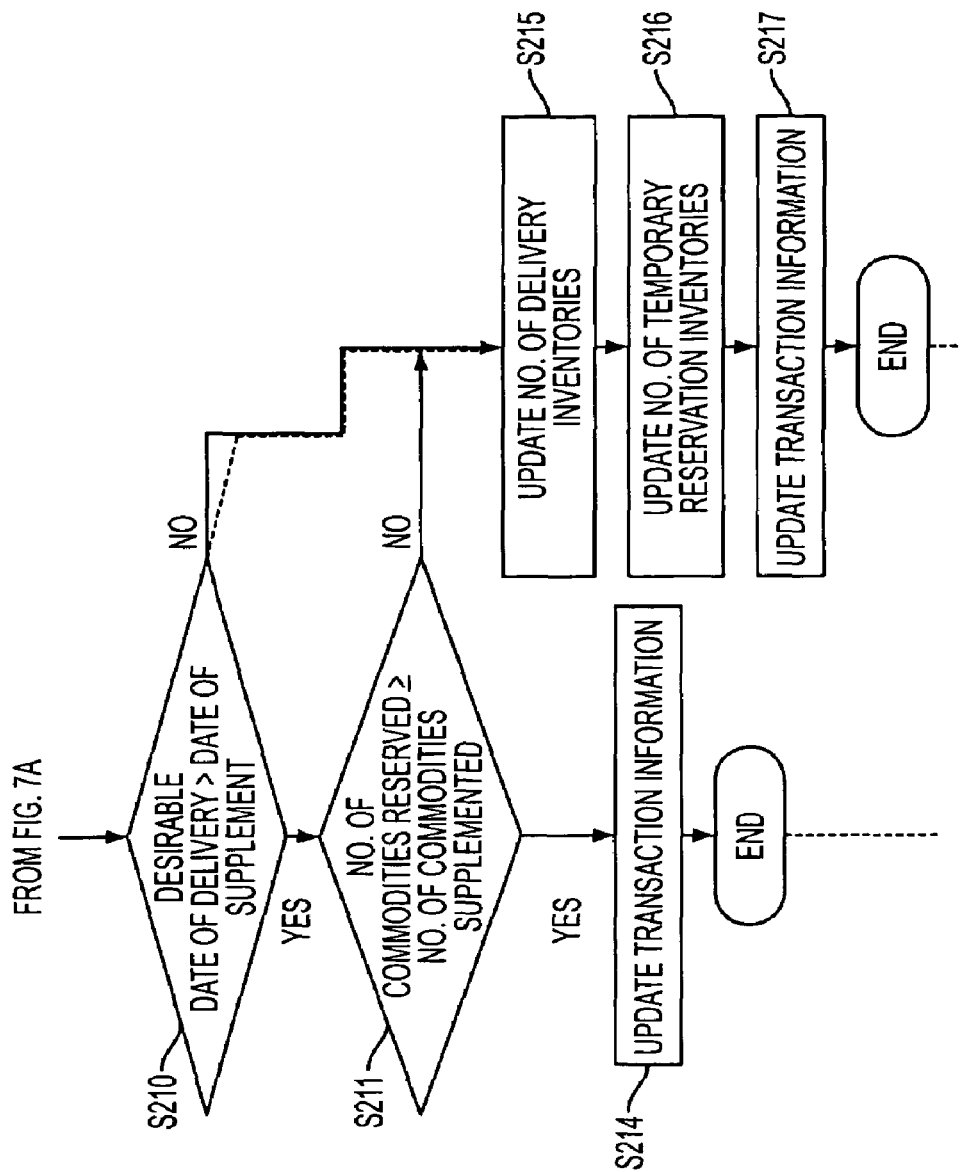

Meanwhile, when "delivery" is selected in the step S205 described above (YES of S205 in FIG. 7A), the POS terminal 300 accepts input of the desirable date of delivery (S209 in FIG. 7A), notifies the commodity code 3161 for identifying the commodity and the desirable date of delivery to the shop server 100, and requests execution of the process for "delivery." Upon reception of this request, the shop server 100 refers to the date of supplement 1161 indicated in the quasi-inventory information 115 of the shop inventory table 110 identified with the commodity code 3161, 1241 notified from the POS terminal 300 and judges whether the next supplement can be acquired before the desirable date of delivery (S210 in FIG. 7B).

For example, when the desirable date of delivery is set after the date of supplement 1161, the next supplement is judged to be acquired until or before the desirable date of delivery (YES of S210 in FIG. 7B) and moreover it is judged whether the number of commodities of temporary reservation for the delivery to customer 1242 is enough by the next supplement 1161 (S211 in FIG. 7B). For example, when the number of commodities to be supplemented 1162 indicated in the quasi-inventory information 116 described above is equal to or larger than the number of commodities reserved, which is attained by adding the number of commodities of temporary reservation for the delivery to customer 1242 to the decided number of commodities of temporary reservation 1163 for the commodities to be supplemented next, the number of commodities of temporary reservation for the delivery to customer 1242 is judged to be enough by the commodities of the next supplement 1162 (YES of S211 in FIG. 7B) and the status code 1243 indicated in the transaction information 124 of the customer table 120 indicating the transaction described above is updated to delivery status from settlement status (S214 in FIG. 7B). Above processes are executed when "delivery" is selected and become the flows of processes for the settlement when the commodities of the next supplement can be acquired before the desirable date of delivery. In this embodiment, the transfer method "delivery" is designated when the commodity is selected. When the next supplement is judged to be acquired before the desirable date of delivery, update process of the number of inventories of temporary reservation of the shop inventory information is no longer required, because the temporary reservation is not conducted for the present number of inventories for selling.

On the other hand, when the desirable date of delivery is set to the day before the date of next supplement in the step S210 (NO of S210 in FIG. 7B), or when in step S211 described above, the number of commodities reserved, which is attained by adding the number of commodities of temporary reservation for delivery to customer 1242 to the decided number of commodities 1163 of temporary reservation for the commodities to be supplemented, is greater than the number of supplemented commodities 1161 (NO of S211 in FIG. 7B), the next supplement is judged not to be acquired before the desirable date of delivery and the number of delivery inventories indicated in the inventory information 115 of the shop inventory table 110 identified with the commodity code 1241 notified from the POS terminal 300 is updated by adding thereto the number of commodities of temporary reservation for the delivery to customer (S215 in FIG. 7B).

The temporary reservation information indicated in the quasi-inventory information 116 described above is updated by subtracting therefrom the number of commodities of temporary reservation for the delivery to customer 2142 (S216 in FIG. 7B). The shop server 100 updates the status code 1243 indicated in the transaction information 124 of the customer table 120 indicating the transaction described above to delivery status from settlement status (S217 in FIG. 7B). Above processes are executed when the "delivery" is selected as the transfer method and become the flows of processes for settlement when the next supplement cannot be acquired before the desirable date of delivery.

Next, flows of processes for transfer of commodity will be explained with reference to FIG. 8. First, the staff of shop reads, using the card information read/write section 410 of the transfer counter PC 400, the customer card information 510 of the customer card presented by a customer into the transfer counter PC 400 (S310 in FIG. 8).

The transfer counter PC 400 notifies the customer code 311 read from the customer card information 510 and the date and time (date and time of settlement) when the customer card information is read out to the shop server 100 and requests acquisition of the transaction information 124 of the customer code 311. The shop server 100 acquires the customer information 124 corresponding to the customer code received from the transfer counter PC 400 from the customer table 120 (S302 in FIG. 8), extracts the transaction information 124 having the status code 1243 of settlement status from the history information 123 of the date and time same as that of settlement, and returns the same transaction information 124 to the transfer counter PC 400 (S303 in FIG. 8).

Figure 8:
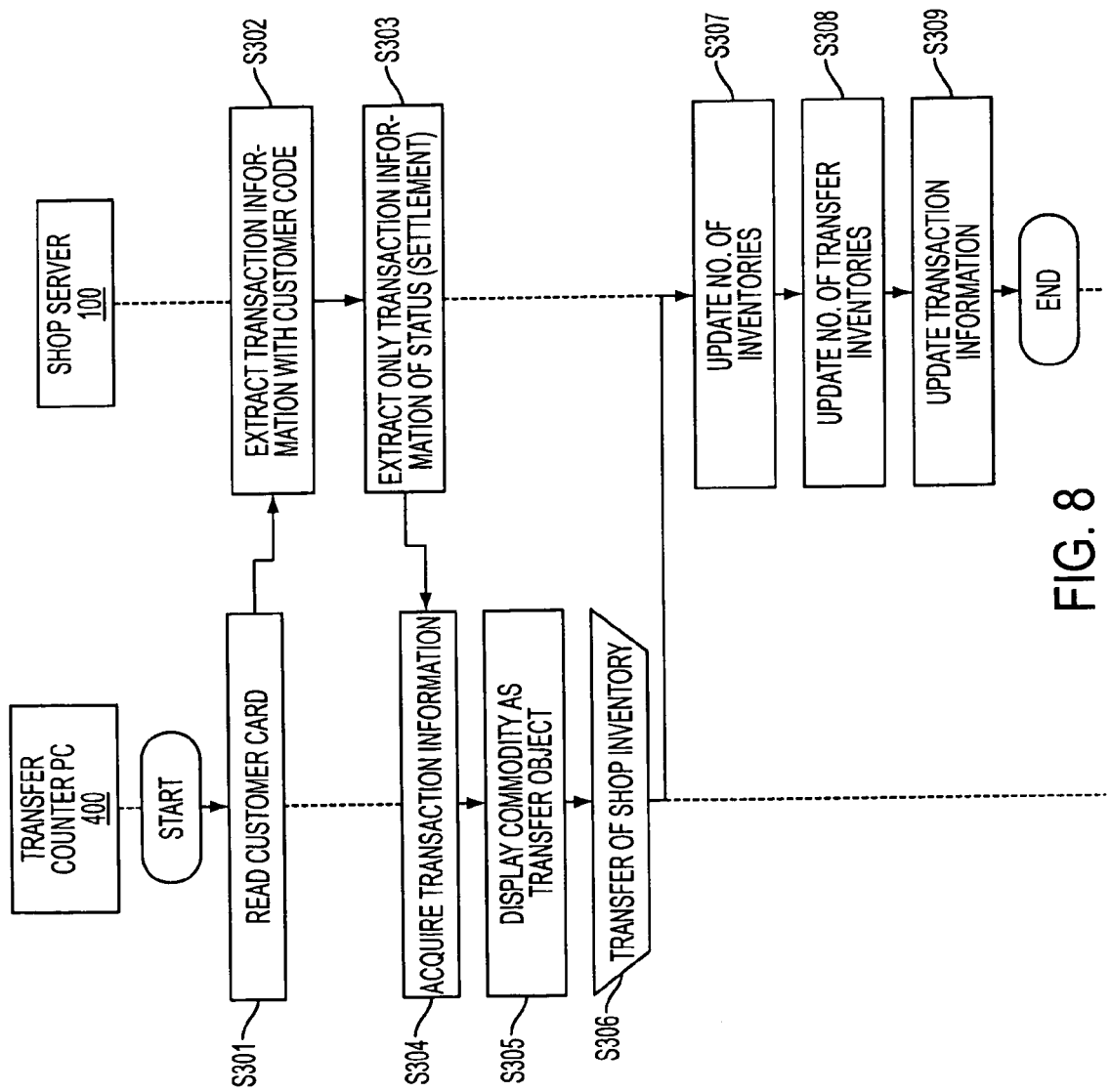
FIG. 8 is a flowchart of transferring commodity in the embodiment of the present invention.

The transfer counter PC 400 having acquired the transaction information 124 for the settlement displays the information of each commodity identified with the commodity code 1241 of the transaction information 124 on the display section 420 and outputs instruction of transfer of the relevant commodity with characters or voices or the like (S305 in FIG. 8). The staff of shop having received the instruction transfers the shop inventory 110 of the relevant commodity to the customer who has presented the relevant customer card 500 (S306 in FIG. 8).

Thereafter, the transfer counter PC 400 notifies, to the shop server 100, the commodity code 1241 for identifying the commodity transferred and the customer code 311 for identifying the customer or the like to request execution of the processes for completing the commodity transfer. The shop server 100 having received such request, updates, first, the number of inventories 1151 indicated in the inventory information 115 of the shop inventory table 110 identified with the commodity code 1241 notified from the transfer counter PC 400 by subtracting therefrom the number of commodities transferred to the customer 1242 (S307 in FIG. 8).

Moreover, the transfer counter PC 400 also updates the number of transfer inventories 1153 indicated in the inventory information 115 of the shop inventory table 110 identified with the commodity code 1241 notified from the transfer counter PC 400 by subtracting therefrom the number of commodities transferred to the customer 1242 (S308 in FIG. 8). Thereafter, the shop server 100 updates the status code 1243 indicated in the transaction information 124 of the customer table 120 indicating the transaction described above to completion of transfer status from settlement status (S309 in FIG. 8). The flows of processes described above the flows of processes for transfer of commodity when the "take-out" is selected as the transfer method.

In the embodiment explained above, the customer code 311 for identifying a customer and the purchase history of customer have been obtained by reading the customer card information 510 from the customer card 500 (an integrated circuit or smart type card) of the customer using the showcase PC 200 or the like, but the present invention is not limited thereto. For example, it is also possible to provide the structure that an information tag given the commodity code is attached to the commodity being displayed in the shop, a customer acquires the commodity code using an information terminal (for example, a mobile phone having the function to read RFID) formed in the structure to read the commodity code from the information tag, and the temporary reservation request of the relevant commodity is transmitted to the shop server 100 from such information terminal.

Moreover, in the embodiment explained above, the transaction information is recorded in the customer card, but it is also allowed that the transaction information is not recorded to the customer card but only in the shop server 100.

The present invention can provide one or more effects listed below.

According to one or more embodiments of the present invention, there is provided the effect that when a customer desires the "delivery" of shop inventory acquired for the customer, by accepting the temporary reservation of commodity, such inventory may be used for increasing a chance of purchase by a new customer by returning such inventory to the number of inventories for selling and thereby the inventory for the customer who is thinking or contemplating a purchase of the same commodity can be acquired and the chance of purchase by the new customer can also be attained.

According to one or more embodiments of the present invention, there is provided the effect that a customer is capable of utilizing the system of the present invention when the customer carries a customer card distributed when the customer enters the shop by introducing the structure that the commodity is selected using the showcase PC 200 provided in the commodity showcase.

According to one or more embodiments of the present invention, a commodity displayed on the rack is given the attached information tag having the commodity code for identifying the relevant commodity. A customer executes the manipulations for obtaining a commodity code of the commodity being displayed using the information terminal having the function to read the commodity code from the information tag (for example, a mobile phone or the like having the function to read the RFID (Radio Frequency Identification)). Thereafter, the request of temporary reservation of the relevant commodity may be transmitted to the shop sever 100 from the information terminal described above. This structure will result in the effect that facility investment for the shop can be lowered in comparison with the investment required when a terminal is installed on the showcase.

According to one or more embodiments of the present invention, situation that the sales information, for example, the price of the commodity being displayed in the shop is stolen by the competitive shops can be prevented by introducing the structure that the transaction information is never recorded to the customer card but recorded only in the shop server 100 or the structure that the transaction information is erased from the customer card of the customer who is passing the entrance of the shop by installing the non-contact type card information read/write section to the area near the entrance of the shop.

According to one or more embodiments of the present invention, the transaction information can be displayed on the display section of the customer card and the customer can easily detect his purchasing condition of the commodity by providing the structure to record the transaction information into the customer card. The present invention provides, an automated commodity customer delivery driven method/system to manage commodity sales by acquiring a chance of purchase of a selecting customer as well as another new customer for a relevant commodity by assuring availability of the inventory for both customers of the relevant commodity. The shop inventory for the selecting customer is acquired according to acceptance of a temporary reservation status for requesting acquisition of the inventory of the selected commodity and the inventory in the shop that was acquired for the selecting customer is returned to the number of inventories for selling to the other new customer, based upon a specified method of transferring the selected commodity to the selecting customer.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A commodity purchasing management system, comprising:
   a customer identifying information acquirer acquiring customer identification information identifying a customer;
   an inventory storage storing inventory information including a number of inventories of each commodity;
   a commodity identifier that identifies a commodity requested by the customer;
   a customer commodity transfer specifier specifying a type of a transfer method of the commodity identified by the commodity identifier based upon the request by the customer;
   a judger judging whether a number of the inventories of the identified commodity in the inventory storage is assignable to the requesting customer, according to the specifying of the type of the transfer method to transfer the identified commodity to the requesting customer; and
   a commodity assigner that assigns the number of the inventories of the identified commodity in the inventory storage to the requesting customer, when the number of the inventories of the identified commodity in the inventory storage is assignable according to a result of the judging.

2. The commodity purchasing management system according to claim 1,
   wherein the inventory information further includes a number of inventories already reserved in other transaction for each commodity as reserved inventories, and
   wherein the judger judges whether the number of the inventories of the identified commodity in the inventory storage is assignable to the requesting customer, based upon the type of the commodity transfer method obtained from the customer commodity transfer specifier and the inventory information including the number of reserved inventories of the identified commodity.

3. The commodity purchasing management system according to claim 1, wherein the inventory information stored in the inventory storage for the commodity identified with the commodity identifier is exclusively updated based upon the type of the commodity transfer method and based upon updating of the number of the inventories of the identified commodity.

4. The system according to claim 1, wherein the judger judges that the number of the inventories of the identified commodity is assignable to the customer, when the type of the commodity transfer method is set as "take-out."

5. The system according to claim 1, further comprising a quasi-inventory storage stores a date of next commodity supplement to supplement the number of inventories of each commodity and the number of commodities to be supplemented,
   wherein the judger judges that the number of inventories of the identified commodity is assignable to the customer, when the type of the commodity transfer method is not set as "take-out" and assignment to the customer from the number of commodities to be supplemented by the next and subsequent commodity supplement is impossible.

6. The system according to claim 1, further comprising a quasi-inventory storage storing a date of next commodity supplement to supplement the number of inventories of each commodity and the number of commodities to be supplemented,
   wherein the judger judges that assigning the number of the inventories of the identified commodity to the customer is omissible, when the type of the customer commodity transfer method is not set as "take-out" and the assignment to the customer from the number of commodities of the next and subsequent commodity supplements is possible, and cancels the assignment of the inventories of the identified commodity to the customer, if according to the judging the assigning is omissible.

7. The commodity purchasing management system according to claim 6, wherein the information stored in the inventory storage and the quasi-inventory storage for the commodity identified with the commodity identifier is exclusively updated based upon the type of the commodity transfer method and based upon updating of the assigned commodities of the quasi-inventory storage.

8. The system according to claim 6, further comprising a quasi-inventory assigning unit that assigns to the customer the number of the next supplement commodities stored in the quasi-inventory storage.

9. A method of managing commodity purchasing, comprising:
- acquiring customer identification information identifying a customer;
- storing inventory information including a number of inventories for each commodity;
- identifying a commodity requested by a customer;
- specifying a type of a transfer method to the customer of the identified commodity requested by the customer, as a type of a commodity transfer method;
- judging whether a number of inventories of the identified commodity is assignable to the requesting customer according to the specified type of commodity transfer method for the identified commodity by the requesting customer; and
- assigning to the customer the number of the inventories of the identified commodity, when the number of the inventories of the identified commodity is assignable according to the judging.

10. The commodity purchasing management method according to claim 9, further comprising storing as the inventory information a number of inventories already reserved in other transaction for each commodity as reserved inventories;
- wherein the judging judges whether the number of the inventories of the identified commodity is assignable based upon the type of the commodity transfer method and the inventory information including the number of reserved inventories of the identified commodity.

11. The commodity purchasing management method according to claim 9, further comprising:
- updating the inventory information for the commodity identified in the commodity identifying exclusively based upon the specified type of the commodity transfer method and based upon updating of the number of the inventories of the identified commodity.

12. The method according to claim 9, wherein the judging judges that the number of the inventories of the identified commodity is assignable to the customer, when the type of the commodity transfer method is set as "take-out."

13. The method according to claim 9, further comprising storing as quasi-inventory information a date of next commodity supplement to supplement the number of inventories of each commodity and the number of commodities to be supplemented,
- wherein the judging judges that the number of inventories of the identified commodity is assignable to the customer, when the type of the commodity transfer method is not set as "take-out" and assignment to the customer from the number of commodities to be supplemented by the next and subsequent commodity supplement is impossible.

14. The method according to claim 9, further comprising storing as quasi-inventory information a date of next commodity supplement to supplement the number of inventories of each commodity and the number of commodities to be supplemented,
- wherein the judging judges that assigning the number of the inventories of the identified commodity to the customer is omissible, when the type of the customer commodity transfer method is not set as "take-out" and the assignment to the customer from the number of commodities of the next and subsequent commodity supplements is possible, and cancels the assignment of the inventories of the identified commodity to the customer, if according to the judging the assigning is omissible.

15. The method according to claim 14, further comprising assigning to the customer the number of the next supplement commodities from the quasi-inventory information.

16. The commodity purchasing management method according to claim 14, further comprising:
- updating the inventory information and the quasi-inventory information for the commodity identified in the commodity identifying exclusively based upon the specified type of the commodity transfer method and based upon updating of the assigned quasi-inventory commodities.

17. An apparatus, comprising:
- a database storage storing a number of inventories and quasi-inventories for each store commodity;
- a customer identifier acquiring customer identification information identifying a customer;
- a commodity identifier that identifies a commodity selected by the identified customer according to commodity identification information; and
- a programmed computer processor controlling the apparatus according to a process comprising:
  - specifying by the identified customer a method of transferring the selected commodity to the identified customer, according to the identified commodity;
  - judging, according to the specified method of transferring the selected commodity to the identified customer, whether a number of inventories of the selected commodity and/or a number of quasi-inventories of the selected commodity in the inventory storage is assignable to the identified customer; and
  - assigning to the identified customer the number of inventories of the selected commodity and/or the number of quasi-inventories of the selected commodity in the inventory storage, according to the judging.

18. The apparatus of claim 17, wherein the customer identifier is an integrated circuit type card storing customer transaction information comprising the customer identification information and readable by the apparatus.

19. The apparatus of claim 17,
- wherein the commodity identifier is a Radio Frequency Identification (RFID) information tag that stores the commodity identification information that identifies the commodity selected by the customer, and
- wherein the customer identifier is a mobile information terminal having an RFID reader to read the RFID information tag, the mobile information terminal transmitting customer transaction information comprising the customer identification information and the commodity identification information read from the REID information tag to the apparatus.

* * * * *

UNITED STATES PATENT AND TRADEMARK OFFICE
CERTIFICATE OF CORRECTION

| | | |
|---|---|---|
| PATENT NO. | : 7,401,735 B2 | |
| APPLICATION NO. | : 11/222782 | |
| DATED | : July 22, 2008 | |
| INVENTOR(S) | : Naoki Takahashi et al. | |

It is certified that error appears in the above-identified patent and that said Letters Patent is hereby corrected as shown below:

Column 18, Line 56, change "REID" to --RFID--.

Signed and Sealed this

Twenty-fifth Day of November, 2008

JON W. DUDAS
*Director of the United States Patent and Trademark Office*